UNITED STATES PATENT OFFICE.

ADOLF FLÜGGE, OF HANOVER, GERMANY.

PROCESS OF MAKING FERROUS CARBONATE.

No. 842,452.  Specification of Letters Patent.  Patented Jan. 29, 1907.

Application filed November 15, 1906. Serial No. 343,531.

*To all whom it may concern:*

Be it known that I, ADOLF FLÜGGE, pharmaceutical chemist, and a resident of 4 Lavesstrasse, Hanover, Kingdom of Prussia, German Empire, have invented new and useful Improvements in Processes for the Manufacture of Pure Ferrous Carbonate, of which the following is a specification.

The manufacture of ferrous carbonate in the cold, according to this invention, rests upon the observation that the alkaline bicarbonates are able to convert powdered ferrous sulfate completely into ferrous carbonate with formation of alkali sulfate when the said powder is intimately ground with the alkali carbonate in glycerin or sugar solution.

For the purpose of the manufacture powdered ferrous sulfate from which all air has been expelled previously by means of carbon dioxid is ground with some glycerin or simple syrup to a thin paste, and to the latter the necessary alkali carbonate, also free from air, is added gradually with constant stirring until the reaction—that is to say, the evolution of carbon dioxid—has ceased. For the bicarbonate there may be substituted in part the normal carbonate. One hundred parts of powdered ferrous sulfate require about eighty parts of potassium or sodium bicarbonate. The reaction may be expressed by the following equation:

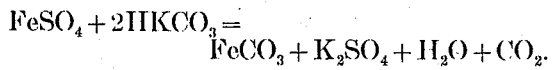

$$FeSO_4 + 2HKCO_3 = FeCO_3 + K_2SO_4 + H_2O + CO_2.$$

The complete conversion of the ferrous sulfate into ferrous carbonate and alkali sulfate is recognized by the fact that the mass no longer tastes of iron, and that when a sample of the mass is shaken with water and filtered the filtrate is no longer colored blue by potassium ferrocyanid or potassium ferricyanid. The matter left on the filter can be easily dissolved in dilute acid with evolution of carbon dioxid and shows all the reactions of iron. The filtrate from the ferrous carbonate gives with barium nitrate a plentiful white precipitate insoluble in nitric acid.

The mass, consisting of ferrous carbonate and alkali sulfate, is mixed with sufficient water previously saturated with carbon dioxid to dissolve the alkali sulfate. The whole is allowed to settle in order to render the precipitate of ferrous carbonate somewhat denser. The supernatant liquid is removed as completely as possible, and the precipitate is introduced into the centrifugal machine in order to separate the residual liquid from the ferrous carbonate by centrifugal force. It is necessary to use water saturated with carbon dioxid in order to prevent oxidation of the ferrous carbonate by atmospheric air.

By the foregoing process there is obtained in the shortest and cheapest manner a ferrous carbonate completely free from objection and having a greenish-white color and a microscopical degree of fineness which is useful medicinally.

Now what I claim, and desire to secure by Letters Patent, is the following:

1. A process for the manufacture of pure ferrous carbonate, which process consists in grinding powdered ferrous sulfate free from air with alkali carbonate free from air with a syrupy liquid in the cold, then mixing the mass with water saturated with carbon dioxid to dissolve the alkali sulfate, and finally separating the ferrous carbonate from the solution by settling and centrifugal action.

2. A process for the manufacture of pure ferrous carbonate, which process consists in grinding one hundred parts of powdered ferrous sulfate free from air with eighty parts of alkali bicarbonate free from air and glycerin in the cold, then mixing the mass with water previously saturated with carbon dioxid to dissolve the alkali sulfate, and finally separating the ferrous carbonate from the solution by settling and centrifugal action.

In testimony that I claim the foregoing as my invention I have signed my name, in presence of two witnesses, this 2d day of November, 1906.

ADOLF FLÜGGE.

Witnesses:
KARL LEISNER,
P. R. THOMPSON.